2 Sheets—Sheet 1.
E. LINDNER.
Revolver.
No. 416.
Reissued Dec. 23, 1856.
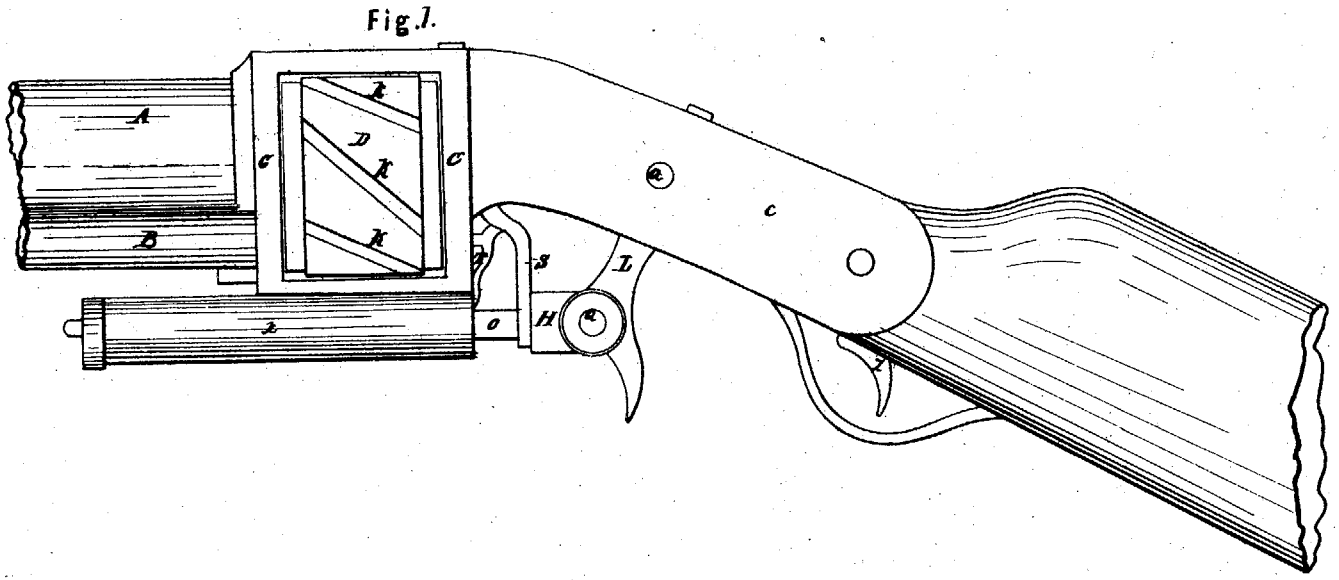
Inventor.
Edward Lindner 2 Sheets—Sheet 2.
E. LINDNER.
Revolver.
No. 416. Reissued Dec. 23, 1856.
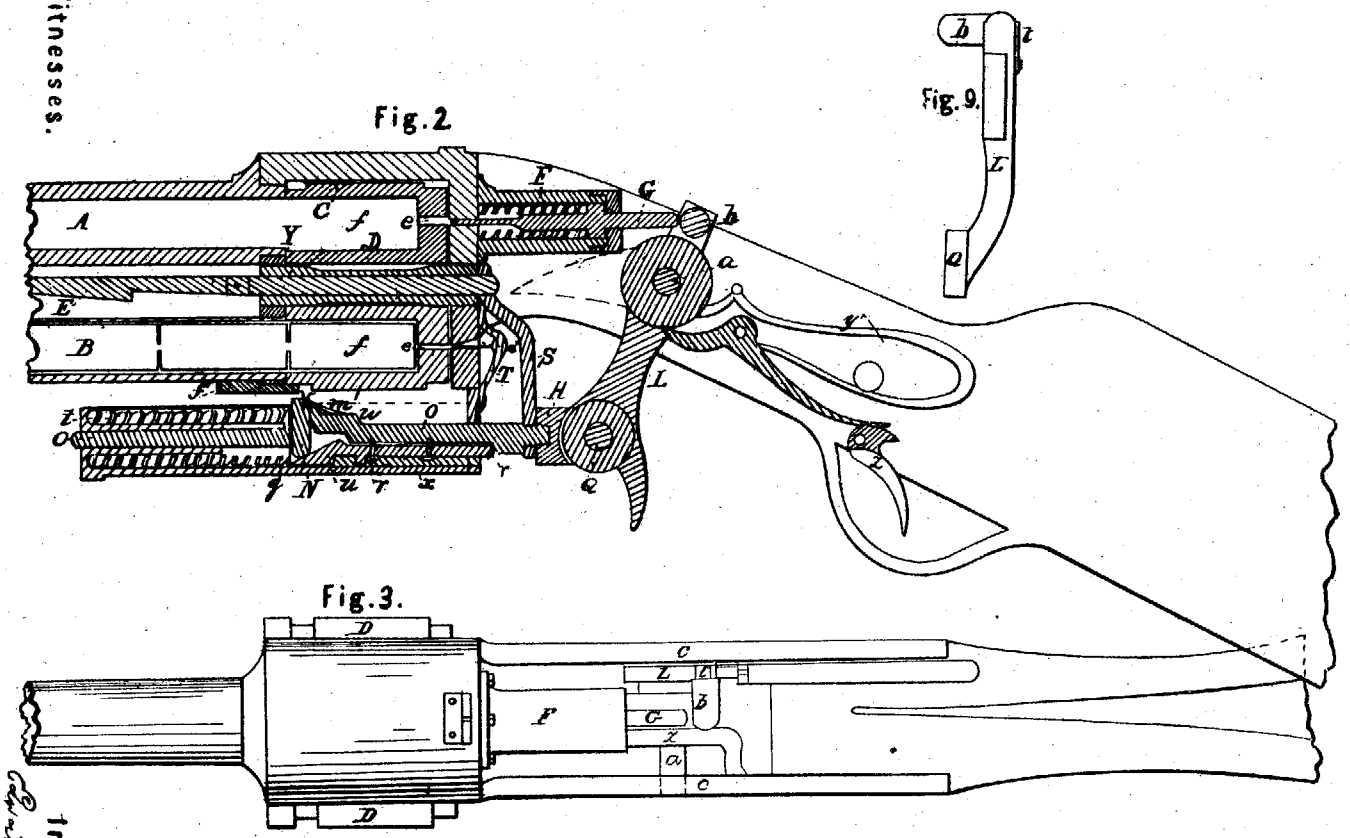
Witnesses.
Inventor.
Edward Lindner

UNITED STATES PATENT OFFICE.

EDWARD LINDNER, OF NEW YORK, N. Y.

IMPROVED MAGAZINE, REPEATING, AND NEEDLE GUN.

Specification forming part of Letters Patent No. 11,197, dated June 27, 1854; Reissue No. 416, dated December 23, 1856.

*To whom it may concern:*

Be it known that I, EDWARD LINDNER, of the city, county, and State of New York, have invented certain new and useful Improvements in Magazine, Repeating, and Needle Guns; and I do hereby declare that the following is a full, clear, and exact description thereof, reference being had to the accompanying drawings, making part of this specification, and to the letters of reference marked thereon, which indicate the same parts in the different figures wherever they occur.

Figure 1 is a side view of the gun; Fig. 2, a longitudinal section; Fig. 3, a top view of the same; and Fig. 9, part of the details which will be hereinafter more particularly referred to.

A is the barrel, screwed into the frame C, which frame has two side plates or projections, *c c*. These plates are the means by which the whole is securely fastened to the wooden butt of the gun.

B is the cartridge-barrel, which is likewise screwed into the frame C. *x* is a tube or box, fastened on the lower side of the frame C, as shown in Figs. 1 and 2, which contains the rod O, provided with a helical spring, P, and which I shall call the "spring-rod."

The spring-rod has a collar, *q*, forged on, against which the spring P bears. This collar is bored through to receive the pin V, by which the breech-piece D is turned. The pin V rests upon a sliding piece, U, which is fastened to the under side of the spring-rod O by screws passing through a slot in such a manner as to allow the same to slide backward and forward, but at the same time to go with the spring-rod when the latter is moved. The sliding piece U has two projections, *r* and *v*, so placed that while it is carried along by the spring-rod O it will be stopped at the proper place by coming in contact with the back end of the tube *x*, while the spring-rod finishes its motion. Where the pin V rests upon the sliding piece U the latter is made wedge shaped, by which means the pin V will be raised or depressed. To insure always a fair bearing of the pin V against the proper surface of the wedge-shaped part of the sliding piece U, this pin is provided with a small spring, *m'*. The spring-rod O is guided in the tube *x*. The head H is screwed onto the end of the spring-rod, and fastens the lower end of the arm S thereto. The arm S serves to communicate motion from the rod O to the rack. The head H rests against the lower rounded part, Q, of the hammer L. On the upper side of the spring-rod O is the projection *w*, which acts upon the locking-spring, as before described. On the outside of the breech-piece D are six grooves, *k k*, Fig. 1, turned on spirally, and in which the pin V is made to work and turn thereby the breech-piece by every movement one-sixth part round, by which operation a charged hole is each time brought into a line with the barrel A and an empty hole or chamber opposite the cartridge-barrel B. The revolving breech-piece D is turned down at each end flush with the bottom of the grooves *k k*, upon which the pin V rises up to the next groove after having turned the breech-piece one-sixth part round.

The gun herein described is intended to be discharged by a needle or punch suddenly perforating the rear end of a cartridge which contains a portion of fulminating-powder or other material which ignites by friction or concussion.

F is a box secured to the frame C in a line with the barrel A, containing the needle-carrier G, with the discharging-needle *n*. A coiled spring abuts against a collar upon the carrier G, Fig. 2, and bears with its other end against the frame C, by which means the needle *n* is always forced out and kept out of the revolving breech-piece, except when pressed in by the hammer L. The needle-carrier G, with its collar, acts as a guide to the needle *n*. L is the hammer, turning on the pin *a*, secured in the side plates, *c c*. This hammer is provided with stops or catches in connection with the trigger, spring, &c., in the usual way. The upper end of the hammer L, which has to force the needle into the charge, carries a jointed arm, *b*, the joint of which is so constructed as to stop the arm at a position perpendicular to the hammer L, where it is held by the small spring *t*. The arm *b* rests against the end of G when the gun is cocked; but when the hammer is released it forces the needle into the cartridge, and, striking the inclined piece L', is forced upward, allowing the needle to be instantaneously withdrawn by the reaction of its spring, the rear end of G passing under the arm *b*. When the gun is recocked the pressure of the spring *t* brings the arm *b* to its former position.

By the arrangement of the Prussian needle-gun the needle is secured to a small fly-spring carrier, acted upon by a spring, which carrier is disengaged by drawing the trigger of the gun, when the spring darts the needle into the cartridge to effect the discharge. The needle remains in the gun until it is recocked, and is subjected to a detrimental degree of heat and injured by the corrosive action of the gases.

By my improved arrangement the needle is withdrawn at the instant of the discharge, by which any heating of the needle is effectually prevented, and all impediment to revolution of the breech-piece, as far as the needle is concerned, is immediately removed.

I do not claim the igniting-needle or the revolving cylinder, separately considered; but

What I claim as my invention, and desire to secure by Letters Patent, is—

The combination of the igniting-needle with the revolving cylinder or breech-piece, when constructed, arranged, and operated in such a manner that the needle can only be projected when the proper aperture is presented to it, and will always be withdrawn previous to the revolution of the cylinder, substantially as described.

In testimony whereof I have hereunto subscribed my name this 28th day of April, 1856.

EDWARD LINDNER.

In presence of—
JOHN A. STEMMLER,
JOHN N. KATZENMAYER.